United States Patent [19]

Hanai et al.

[11] Patent Number: 5,640,262

[45] Date of Patent: Jun. 17, 1997

[54] CONTROL SYSTEM AND CONNECTING DEVICE

[75] Inventors: Tomoyuki Hanai; Seiya Hamabe, both of Kanagawa, Japan

[73] Assignee: Sony Corporation, Tokyo, Japan

[21] Appl. No.: 591,778

[22] Filed: Jan. 25, 1996

Related U.S. Application Data

[62] Division of Ser. No. 350,590, Dec. 6, 1994, abandoned, which is a continuation of Ser. No. 960,117, Oct. 13, 1992, abandoned.

[30] Foreign Application Priority Data

Oct. 23, 1991 [JP] Japan ................................ 3-275722

[51] Int. Cl.$^6$ ................................ H04B 10/12
[52] U.S. Cl. ................ 359/195; 359/159; 359/163; 359/193; 359/173; 385/47; 385/52; 385/88; 385/92
[58] Field of Search ........................ 359/142, 159, 359/163, 179, 189, 193, 195, 173; 385/24, 47, 52, 80, 88, 92, 93

[56] References Cited

FOREIGN PATENT DOCUMENTS 335377   10/1989   European Pat. Off. .
3411919  10/1984   Germany .

Primary Examiner—Leslie Pascal
Attorney, Agent, or Firm—Jay H. Maioli

[57] ABSTRACT

A control system includes a first device having an infrared ray signal receiving portion and an infrared ray signal transmission portion, and is capable of performing a predetermined operation in accordance with an infrared ray signal received by the infrared ray signal receiving portion and outputting a predetermined infrared ray signal from the infrared ray signal transmission portion, and a second device having an infrared ray signal receiving portion to which the infrared ray signal outputted from the infrared ray signal transmission portion of the first device is applied through an optical cable, and for performing a predetermined operation in accordance with the infrared ray signal received by the infrared ray signal receiving portion thereof.

A connecting device includes a cable connecting portion to which one end of an optical cable is connected; a semipermeable member for reflecting an optical signal outputted from the cable connecting portion and for transmitting therethrough an optical signal outputted from an external device; and a fixing member for fixing the cable connection portion and the semipermeable member to a predetermined device so that the optical signal reflected by or transmitted through the semipermeable member is incident on an infrared ray signal receiving portion of the predetermined device.

3 Claims, 5 Drawing Sheets

CONTROL SYSTEM AND CONNECTING DEVICE

This is a division of U.S. patent application Ser. No. 08/350,590 filed Dec. 6, 1994 now abandoned, which is a continuation of U.S. patent application Ser. No. 07/960,117 filed Oct. 13, 1992, now abandoned.

BACKGROUND OF THE INVENTION

1. Field of the Invention

The present invention generally relates to control systems and connecting devices and, more particularly, is directed to a control system and a connecting device suitable for interlocking a plurality of video devices such as a video tape recorder (VTR) with a satellite broadcast receiving tuner.

2. Description of the Related Art

Some electronic devices such as a VTR and a television receiver have been constructed so as to be remotely controlled in accordance with an infrared ray signal outputted from a remote control device or remote commander. In this case, normally one remote control device is provided for each electronic device. Thus, when using a plurality of such remotely-controllable electronic devices simultaneously, these electronic devices are required to be controlled respectively by corresponding remote control devices which are provided separately for the electronic devices. For example, in a case of recording a broadcasting signal received by a satellite broadcast receiving tuner on a video tape of a VTR by using remote control devices, it is required to set a receiving channel of the tuner by a remote control device for the tuner and further to start a recording operation of the VTR by a remote control device for the VTR.

However, since it is troublesome and awkward to simultaneously operate a plurality of such remote control devices, there has been proposed a technique that a plurality of electronic devices are connected through a control signal transmission line, then an infrared ray signal is transmitted from a remote control device and received by an electronic device serving as a main device, and then remaining electronic devices are operated synchronously in accordance with the received infrared ray signal.

However, in order to connect a plurality of electronic devices through the control signal transmission line, each electronic device is required to have an output and/or an input terminal for a control signal, and so this technique could not be applied to electronic devices which can not input or output the control signal. Further, even if the electronic device can input and output the control signal, only the electronic devices, which operate by the same control signal, can be connected with one another. This is because, normally, codes or formats of the control signal differ for electronic devices which are made by different manufacturers. For example, a VTR employs, as an infrared ray signal having the same function such as the start of replay, a control signal having data structure which is quite different for every manufacturer. Accordingly, even if electronic devices of different manufacturers are connected with each other, the other electronic device can not be operated by a control signal sent from a main electronic device. Thus, normally, the interlocking operation of devices connected through a control signal transmission line based on the above-described technique has been performed only among electronic devices of the same manufacturer.

OBJECTS AND SUMMARY OF THE INVENTION

Therefore, it is an object of the present invention to provide an improved control system and a connecting device in which the aforementioned shortcomings and disadvantages encountered with the prior art can be eliminated.

More specifically, it is an object of the present invention to provide a control system and a connecting device which can easily perform an interlocking operation among a plurality of devices without connecting a control signal transmission line thereamong.

As an aspect of the present invention, a control system is comprised of a first device having an infrared ray signal receiving portion and an infrared ray signal transmission portion, and being capable of performing a predetermined operation in accordance with an infrared ray signal received by the infrared ray signal receiving portion and outputting a predetermined infrared ray signal from the infrared ray signal transmission portion, and a second device having an infrared ray signal receiving portion to which the infrared ray signal outputted from the infrared ray signal transmission portion of the first device is applied through an optical cable, and for performing a predetermined operation in accordance with the infrared ray signal received by the infrared ray signal receiving portion thereof. In this case, the first device stores code data of an infrared ray signal for controlling an operation of the second device.

As another aspect of the present invention, a connecting device is comprised of a cable connecting portion to which one end of an optical cable is connected, a semipermeable member for reflecting an optical signal outputted from the cable connecting portion and for transmitting an optical signal incident from an external device, and a fixing member for fixing the cable connection portion and the semipermeable member to a predetermined device so that the optical signal reflected by or transmitted through the semipermeable member is incident on an infrared ray signal receiving portion of the predetermined device.

According to the control system of the present invention, the second device capable of being remotely controlled by receiving an infrared ray signal can be controlled by the first device, so that both the first and second devices can be commonly controlled by the first device.

According to the connecting device of the present invention, an infrared ray signal transmitted through the optical cable can be incident on the infrared ray signal receiving portion of the predetermined device, and also an infrared ray signal can be directly incident on the infrared ray signal receiving portion of the predetermined device from a remote control device without passing through a cable. Thus, it is possible to control the predetermined device in accordance with both the infrared ray signal transmitted through the optical cable and the infrared ray signal transmitted from the remote control device.

The preceding and other objects, features, and advantages of the present invention will become apparent from the following detailed description of an illustrative embodiment thereof when read in conjunction with the accompanying drawings, in which like reference numerals are used to identify the same or similar parts in the several views.

DETAILED DESCRIPTION OF THE PREFERRED EMBODIMENT

A control system and a connecting device according to an embodiment of the present invention will now be described with reference to FIGS. 1 through 5B.

Figure 1:
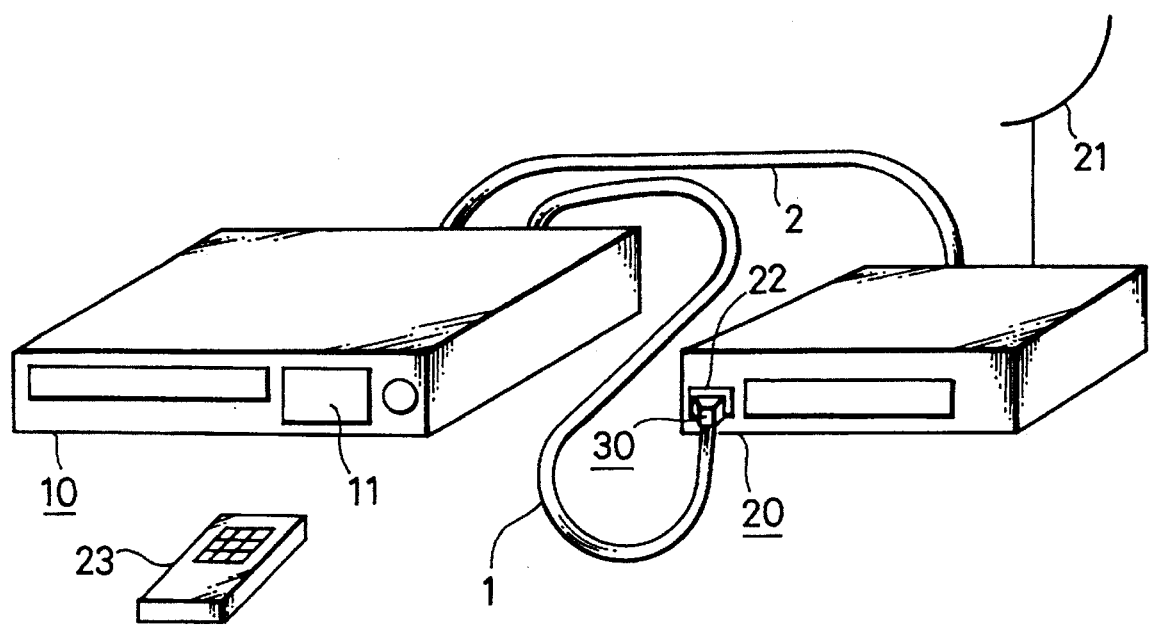
FIG. 1 is a schematic diagram illustrating a control system and a connecting device according to an embodiment of the present invention.

FIG. 1 of the accompanying drawings shows an arrangement of the embodiment of the present invention, in which case, the present invention is applied to a VTR and a satellite broadcast receiving tuner (hereinafter called a BS tuner) which are connected to each other so as to perform an interlocking operation. Referring to FIG. 1, a VTR 10 is constituted so as to record a video and an audio signal on a video tape mounted therein and to reproduce these signals from the video tape. A BS tuner 20 is constituted so as to receive a broadcast wave through a parabolic antenna 21 which is connected to the tuner and demodulate the received broadcast wave into a video and an audio signal of a base band. The BS tuner 20 is connected to the VTR 10 through a video and audio signal transmission cable 2 so that the video and the audio signals received by the BS tuner 20 are supplied to the VTR 10 to record them on the video tape therein.

The VTR 10 and the BS tuner 20 are provided at their front surfaces with infrared ray signal receiving portions 11 and 22, so that the remote control of various operations of the VTR 10 and the BS tuner 20 can be performed in response to infrared ray signals outputted from corresponding remote control devices, respectively.

Figure 2:
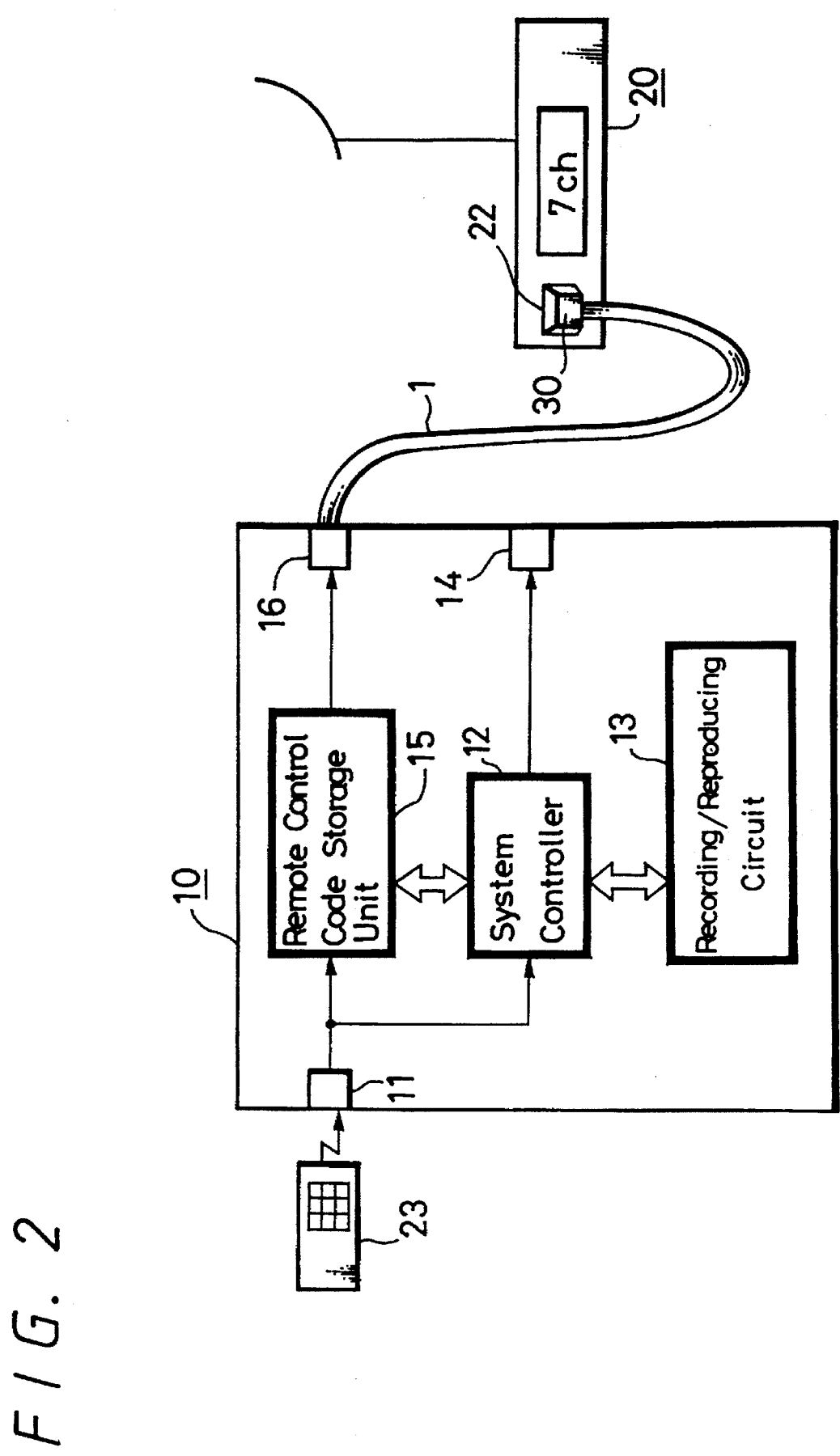
FIG. 2 is a schematic diagram illustrating an arrangement of the VTR shown in FIG. 1.

In this embodiment, the VTR 10 is constituted so as to output a remote control signal to the BS tuner 20. That is, as is clear from FIG. 2 showing the inside arrangement of the VTR 10, the infrared ray signal receiving portion 11 receives an infrared ray signal transmitted from a remote control device 23 and converts it into an electric signal. The electric signal is transmitted to a system controller 12, which in turn discriminates the content or command of the electric signal. The system controller 12 then controls the operation of a recording/reproducing circuit 13 etc. of the VTR 10 in accordance with the discriminated command. Further, the system controller 12 is constituted to output a control signal for operating another device in synchronism with the operation of the VTR 10. The control signal from the system controller 12 is supplied to an interface 14. The interface 14 has a control signal terminal to which one end of a control signal transmission line (not shown) is connected. The control signal from the system controller 12 is transmitted to another device when the other terminal of the control signal transmission line is connected to the another device. This control signal transmission system using the transmission line has been employed conventionally.

The VTR 10 of this embodiment is arranged so as to output the control signal in a form of an infrared ray signal. Namely, the VTR 10 has a remote control code storage unit 15, read and write operations of which are controlled by the system controller 12. In this case, the remote control code storage unit 15 has a so-called learning function that data structure of the infrared ray signal which is received by the infrared ray signal receiving portion 11 can be stored therein under the control of the system controller 12. The remote control code storage unit 15 has storage areas respectively corresponding to different operation commands of a device such as the BS tuner or the like to be connected to the VTR so that data of the received infrared ray signal is stored in a corresponding storage area. Namely, the remote control code storage unit 15 has storage areas respectively provided for different control codes of the BS tuner such as a channel change-over code and a power on/off code or the like, whereby various kinds of data of the infrared ray signal for executing the corresponding operations of the BS tuner are stored in the respective storage areas.

The stored data structure is read out under the control of the system controller 12 and supplied to an infrared ray signal transmission portion 16, which in turn drives a light-emitting diode thereof to generate an infrared ray signal and outputs it from the VTR 10. In this case, the infrared ray signal transmission portion 16 is provided on a rear face of the VTR 10 and designed so that one end of an optical cable or an optical fiber cable 1 is connected thereto.

In this embodiment, one end of a connector 30 is connected to the other end of the optical fiber cable 1, and the connector 30 is constituted so that the other end of the optical fiber cable 1 is mounted in the vicinity of an infrared ray signal receiving portion 22 of the BS tuner 20.

Figure 3:
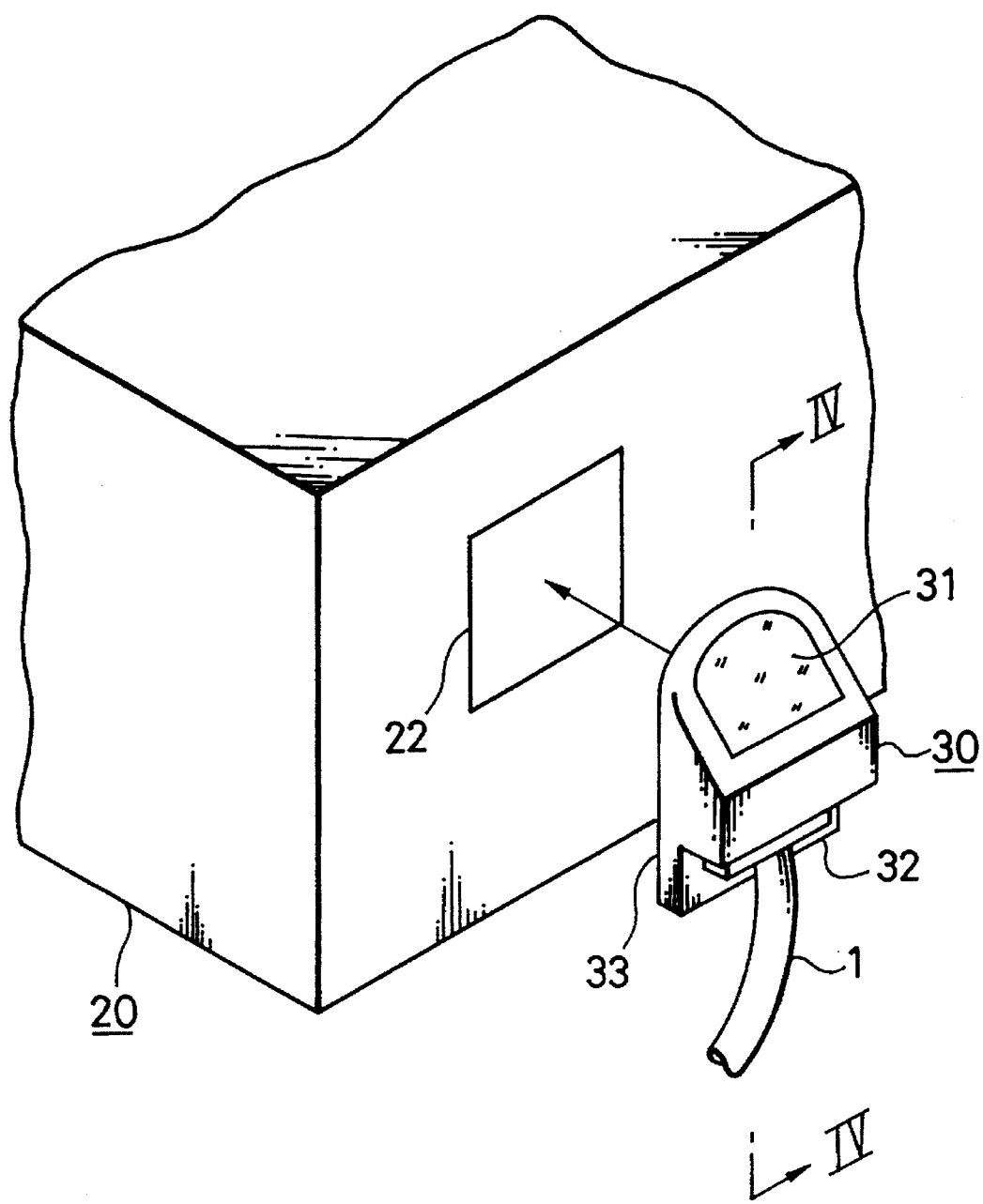
FIG. 3 is a perspective view illustrating the connecting device in FIG. 1.
Figure 4:
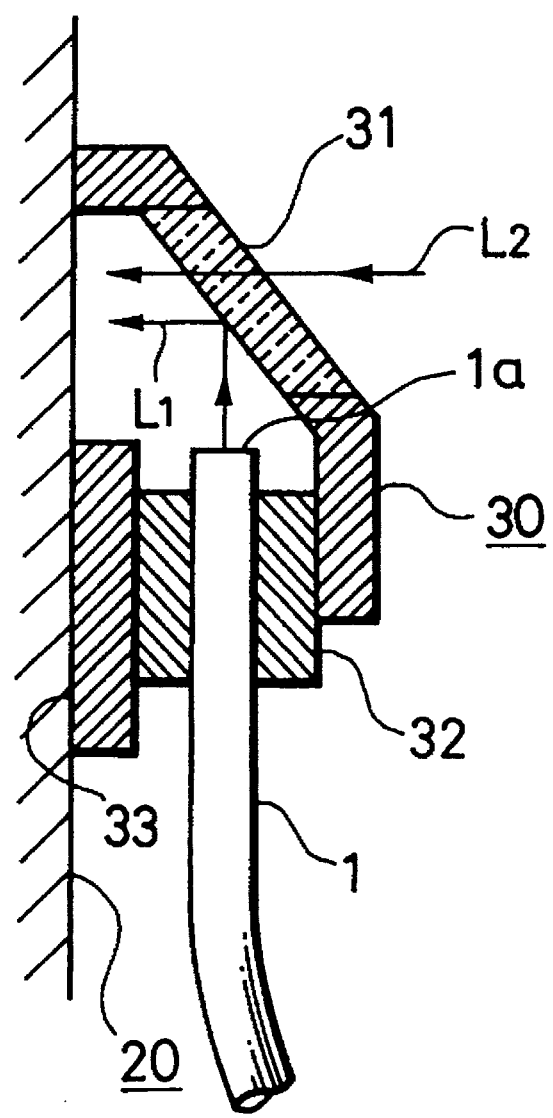
FIG. 4 is a schematic sectional view of the connecting device taken along the line XI—XI in FIG. 3.

The construction of the connector 30 will be explained with reference to FIGS. 3 and 4. Referring to FIG. 3, the connector 30 is fixed to the infrared ray signal receiving portion 22 of the BS tuner 20 by a bonding agent. The connector 30 is formed of synthetic resin such as acrylonitrile-butadiene-styrene (ABS) resin end has a light transmission portion 31 disposed slantly at the top portion thereof. The light transmission portion 31 is formed of resin such as acrylic resin which is entirely transmissive to light and partially reflective to light. Referring to FIG. 4 of the accompanying drawings, the other end portion of the optical fiber cable 1 is fixed to the connector 30 by a fixing member 32 so that an end face 1a of the optical fiber cable opposes to the face of the light transmission portion 31 with an angle of about 45 degrees therebetween. A lens may be incorporated in the end face 1a of the optical fiber cable 1.

The connector 30 is provided with a pressure sensitive adhesive double coated tape on a bottom portion 33 thereof, and fixed by the adhesive strength of the tape to a front panel of the BS tuner 20 on which the infrared ray signal receiving portion 22 is provided.

In this manner, the connector 30 is attached to the infrared ray signal receiving portion 22 of the BS tuner 20. Then, referring to FIG. 4, an infrared ray signal L1 emitted from the end face 1a of the optical fiber cable 1 is reflected by the light transmission portion 31, then directed to the BS tuner 20 and then incident on the infrared ray signal receiving portion 22. Further, an infrared ray signal L2 directed to the BS tuner 20 from an external device, for example, a remote control device is incident on the infrared ray signal receiving portion 22 through the light transmission portion 31. Thus, the infrared ray signal receiving portion 22 of the BS tuner 20 with the connector 30 being attached thereto can receive both the infrared ray signal transmitted from the VTR 10 side through the optical fiber cable 1 and that transmitted in a wireless fashion directly from a remote control device 23 for the BS tuner.

Thus, since both the infrared ray signals from the VTR 10 and the remote control device are transmitted to the BS tuner 20, the VTR 10 can transmit commands for various operations to the BS tuner 20. Further, the remote control device for the BS tuner 20 can also directly transmit commands for various operations of the BS tuner such as a channel change-over operation to the BS tuner 20.

In this embodiment, since the remote control code storage unit 15 of the VTR 10 can store remote control codes for the BS tuner 20, the BS tuner 20 can be operated from the VTR 10 even if control cedes differ between the VTR 10 and the BS tuner 20 due to the difference of manufacturer thereof. Namely, as shown in FIGS. 1 and 2, the remote control device 23 for the BS tuner 20 is a separate unit from which an infrared ray signal for operating the BS tuner 20 is emitted and is received in advance by the infrared ray signal receiving portion 11 of the VTR 10. The infrared ray signal received by the portion 11 is supplied to the remote control code storage unit 15 and stored therein. In this case, a command indicating the operation of the BS tuner which is to be executed by the received infrared ray signal is inputted by the key operation of the VTR 10, and therefore data of the received infrared ray signal is stored in one of the storage areas of the storage unit 15 corresponding to the operation of the BS tuner indicated by the inputted command.

After this storage process, the BS tuner 20 can be operated under the control of the VTR 10 on the basis of the stored data. For example, in a case of automatically recording the satellite broadcast on the video tape of the VTR 10 by a timer, the operation of the BS tuner 20 such as a channel number or the like as well as the operations of the VTR 10 such as a recording time and the change of input to the BS tuner side, for example, are simultaneously set by a timer recording setting key.

Thus, at the set time of the timer recording, under the control of the system controller 12 of the VTR 10, the recording operation of the VTR 10 is automatically started, and simultaneously data of a power on code and a channel number setting code for the BS tuner 20 is automatically read from the remote control code storage unit 15 and infrared ray signals of these codes are outputted from the infrared ray signal transmission portion 16 of the VTR 10. The infrared ray signal outputted from the infrared ray signal transmission portion 16 is transmitted to the infrared ray signal receiving portion 22 of the BS tuner 20 through the optical fiber cable 1, and then the BS tuner 20 operates in accordance with the codes of the transmitted infrared ray signal.

Figures 5A, 5B:
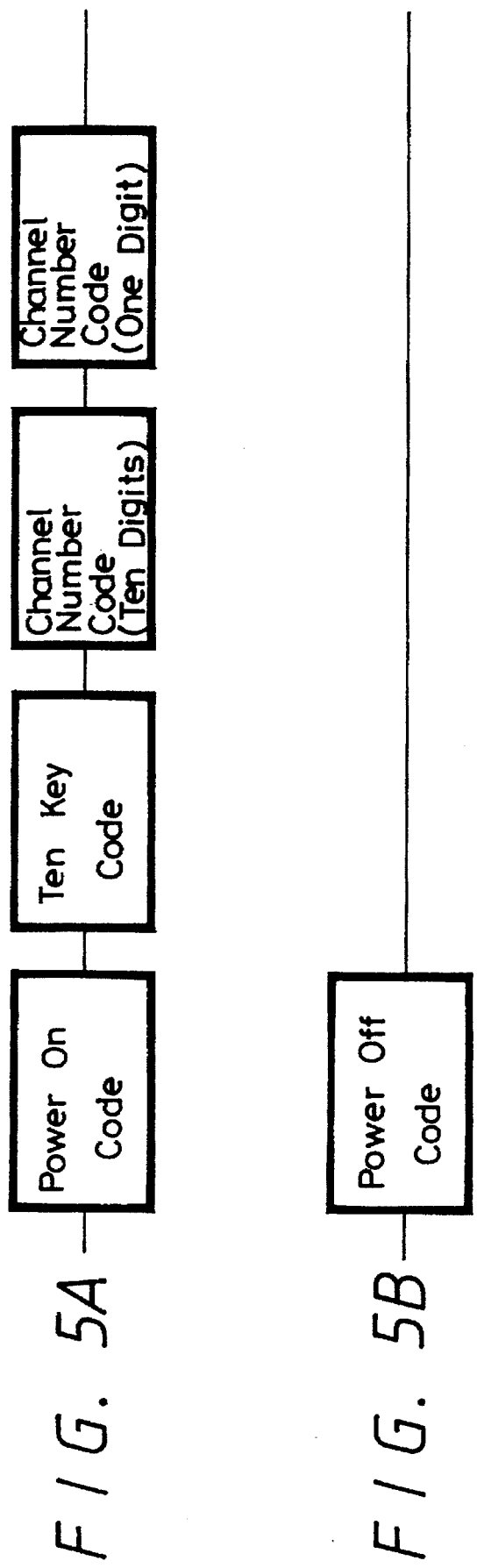
FIGS. 5A and 5B are schematic diagrams illustrating examples of transmission data used in the embodiment in FIG. 1, respectively.

An example of codes of the transmitted infrared ray signal in this case will be shown in FIG. 5A. Referring to FIG. 5A, firstly a power on code is outputted, then a ten key code representing a channel number instructed by a ten key is outputted, and lastly a channel number code representing a channel number of ten digit and that of one digit are outputted, thereby the BS tuner 20 is turned on and the channel number thereof is set.

At a time of terminating the recording operation upon the lapse of a predetermined time after the start of the recording operation, the recording operation on the tape of the VTR 10 is terminated, and also an infrared ray signal representing a power off code for the BS tuner 20, which may be the same as the power on code, shown in FIG. 5B is outputted from the VTR 10 thereby turn off the BS tuner 20.

In a case of viewing the satellite broadcast by using the BS tuner 20 apart from the interlocking or synchronous operation such as the above-described timer operation, commands instructing a power on and a channel number or the like of the BS tuner 20 are directly transmitted to the infrared ray signal receiving portion 22 of the BS tuner 20 from the remote control device 23 for the BS tuner. Thus, the BS tuner 20 can always be operated under the control of the remote control device 23.

In this manner, the interlocking or synchronous operation such as the timer operation can be performed under the control of the VTR 10 even if codes of the infrared ray signal differ between the VTR 10 and the BS tuner 20 due to the difference of manufacturers thereof or the like. In this case, the BS tuner 20 does not need an input terminal for a control signal but requires only a receiving portion for an infrared ray signal. Thus, this embodiment can be applied to any type of BS tuner which is remotely controllable by a remote control device, and so this embodiment is not limited to a certain type of BS tuner.

Further, since the infrared ray signal is transmitted from the VTR 10 to the BS tuner 20 through the optical fiber cable 1, the construction of the control system can be simplified. Namely, the interlocking or synchronous operation like this embodiment may be performed in the following arrangement, in which a control signal outputted from the interface 14 of the VTR 10 is extracted by a predetermined signal line, and then the extracted control signal is converted into an infrared ray signal by a conversion unit which is positioned in the vicinity of the BS tuner 20 and arranged so that an infrared ray signal representing codes corresponding to operations of the BS tuner are outputted from the conversion unit. In this case, however, it is required to supply a power sufficient for outputting the infrared signal to the conversion unit or to supply a driving signal for driving an infrared ray emitting diode, so that the system will be complicated. In contrast, since the control system of this embodiment merely requires the connection of an optical fiber cable, no electrical wiring is required and so the construction of the system is simple and dissipation power thereof is low.

Further, the connector 30 attached to the infrared ray signal receiving portion 22 of the BS tuner 20 is constituted so that an infrared ray signal transmitted in a wireless fashion from an external device as well as an infrared ray signal transmitted through the optical fiber cable 1 are incident on the infrared ray signal receiving portion 22. Thus, it is possible to always control the BS tuner 20 by the remote control device 23 for the BS tuner 20, and so the control functions of the BS tuner are not limited. Namely, the connector 30 is not required to be removed in a case of controlling the BS tuner 20 by the remote control device for the BS tuner, which is convenient in the handling of the system.

While, in the above-described embodiment, a BS tuner is connected to a VTR, another video device may be connected to the VTR with the same effects being achieved. For example, two VTRs may be connected each other so as to perform an editorial operation. Further, while a VTR is used as a main device in this embodiment, another electric device which is remotely controllable by an infrared ray signal may be used as a main device. In this case, a plurality of devices which are remotely controlled by the main device Way be connected to the main device. In this case, a light diffusion unit, for example, may be positioned on the way of the optical fiber cable so that the optical fiber cable is branched by the light diffusion unit and an infrared ray signal outputted from the main device is transmitted to a plurality of devices.

While, in the embodiment, code data of the remote control signal for the other device (BS tuner) is stored in the main device (VTR) by the so-called learning operation, the present invention may be arranged in a manner that code data of remote control signals for different manufacturers are stored in advance in the memory of the main device so that, by merely setting the manufacturers of the devices connected to the main device, the main device automatically outputs infrared ray signals corresponding to the devices connected thereto.

As set out above, according to the control system of the present invention, when the system is constituted by a first and a second device such as a VTR and a BS tuner which are required to be operated in an interlocking fashion, the second device remotely controllable by receiving an infrared ray signal can be controlled by the first device, so that both the first and second devices can be commonly controlled on the first device.

According to the connecting device of the present invention, an infrared ray signal transmitted from a device through the optical fiber cable can be incident on the infrared ray signal receiving portion of another device, and also an infrared ray signal can be directly incident on the infrared ray signal receiving portion from the remote control device without passing through a cable. Thus, it is possible to connect the device to another device through the optical fiber cable without affecting such a function of the device having the infrared ray signal receiving portion that it is remotely controllable by the remote control device for the device.

Having described the preferred embodiment of the invention with reference to the accompanying drawings, it is to be understood that the invention is not limited to the precise embodiment and that various changes and modifications could be effected therein by one skilled in the art without departing from the spirit or scope of the invention as defined in the appended claims.

What is claimed is:

1. A connecting device comprising:

a cable connecting portion to which an end of an optical cable is connected;

a semipermeable member disposed opposite said cable connecting portion for reflecting an infrared ray signal output from said cable connecting portion and for transmitting therethrough an infrared ray signal output from an external device; and a fixing member for fixing said cable connection portion and said semipermeable member to a predetermined device so that said infrared ray signal reflected from said cable connecting portion and said infrared ray signal transmitted through said semipermeable member are incident on an infrared ray signal receiving portion of said predetermined device.

2. The connecting device according to claim 1, wherein said semipermeable member is made of a synthetic resin.

3. The connecting device according to claim 2, wherein said synthetic resin is an ABS resin.

* * * * *